US008868556B2

(12) United States Patent
Fei et al.

(10) Patent No.: US 8,868,556 B2
(45) Date of Patent: Oct. 21, 2014

(54) METHOD AND DEVICE FOR TAGGING A DOCUMENT

(75) Inventors: Ben Fei, Beijing (CN); Bo Hu, Beijing (CN); Zhong Su, Beijing (CN); Xian Wu, Beijing (CN); Xiao Xun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 12/430,200

(22) Filed: Apr. 27, 2009

(65) Prior Publication Data

US 2009/0271353 A1    Oct. 29, 2009

(30) Foreign Application Priority Data

Apr. 28, 2008   (CN) .......................... 2008 1 0091289

(51) Int. Cl.
*G06F 7/00* (2006.01)
*G06F 17/30* (2006.01)
*G06F 17/22* (2006.01)

(52) U.S. Cl.
CPC ...... *G06F 17/30896* (2013.01); *G06F 17/2282* (2013.01); *G06F 17/2247* (2013.01)
USPC ................................. 707/736; 715/232

(58) Field of Classification Search
USPC ...................................... 701/705
See application file for complete search history.

(56) References Cited

U.S. PATENT DOCUMENTS

| | | | |
|---|---|---|---|
| 7,219,102 B2 | 5/2007 | Zhou et al. | |
| 8,230,326 B2* | 7/2012 | Albornoz et al. | 715/231 |
| 2004/0139059 A1 | 7/2004 | Conroy et al. | |
| 2005/0066271 A1 | 3/2005 | Uchiyama et al. | |
| 2007/0156677 A1* | 7/2007 | Szabo | 707/5 |
| 2007/0156748 A1 | 7/2007 | Emam et al. | |
| 2007/0176947 A1* | 8/2007 | Kenyon | 345/629 |
| 2007/0219988 A1* | 9/2007 | Mueller et al. | 707/5 |
| 2008/0082478 A1* | 4/2008 | Nonomura | 707/1 |

OTHER PUBLICATIONS

Markuss Geilfuss et al, "SAM—an annotation editor for parallel texts", Proceedings of LREC 2006, 4 pages.*
A. J. Bernheim Brush et al, "Robust Annotation Positioning in Digital Documents", ACM 2001, 8 pages.*
Atlas: "A Flexible and Extensible Architecture for Linguistic Annotation", Proceedings of the Second International Conference on Language Resources and Evaluation, pp. 1699-1706, Paris: European Language Resources Association, 2000.*
Godby, et al, "Automatically Generated Topic Maps of World Wide Web Resources", Annual Review of OCLC Research, 1999, pp. 1-10.
Kim, et al., "Discovering Taxonomic Relationships from Textual Documents", Proceeding (351) Applied Informatics, actapress.com, 2002, pp. 1-5.
R. Freeman, "Web Content Management by Self-Organization", IEEE Transactions on Neural Networks, vol. 16, No. 5, Sep. 2005, pp. 1256-1268.
X. Wu, "Hierarchical Topic Term Extraction for Semantic . . . System", Shanghai Jiao Tong University, ASWC 2006, LNCS 4185, pp. 30-43, 2006.

* cited by examiner

*Primary Examiner* — Uyen Le
(74) *Attorney, Agent, or Firm* — Jeff Tang (57) ABSTRACT

There are disclosed a method and a device for tagging a document. The method includes the steps of acquiring structural information of the document, retrieving a content block list corresponding to a user-input tag, comparing blocks in the structural information with blocks in the content block list, to obtain similar blocks, and annotating the user-input tag at positions, which correspond to the similar blocks, in the document.

19 Claims, 6 Drawing Sheets

METHOD AND DEVICE FOR TAGGING A DOCUMENT

CROSS REFERENCE TO RELATED APPLICATIONS

This application claims priority under 35 U.S.C. §119 from Chinese Patent Application number 200810091289.7, filed on Apr. 28, 2008, the entire contents of which are incorporated herein by reference.

BACKGROUND OF THE INVENTION

With the rapid popularization of electronic documents, electronic documents gradually hold a more and more important position in many aspects of human life. Additionally, many electronic documents are very large at present. In this situation, a user can hardly find out a document content of his (her) interest merely through the document's catalogue and index. Although current Internet applications contain summary information and structural information for some documents, a user cannot grasp the summary information and structural information of a document in a short time, let alone rapidly find paragraphs of his (her) desired content out of a document having, for example, dozens of or even as many as hundreds of pages.

Hence, a scheme called "annotation" or "tagging" has emerged in applications for electronic documents. In this solution, a user can, upon reading of a specific content of a document, annotate the content using a succinct or general phrase as a tag. This procedure is usually called "annotation" or "tagging," wherein a tag is a brief semantic description defined by a user for document content. For example, upon reading of document content about commercial housing price, a user tags the document content using a tag "house price." When other user reads the document content, the tag annotated by a previous user for this document content can be displayed at the same time. Since tags have manual generalization results made by previous users for document content, tagging has become a very popular method which makes users to remark, collect and organize concerned electronic documents. There are currently the following two main manners of providing tagging service: providing tagging by a network service provider which provides a document content, and providing tagging by a network service provider which provides tagging service specially. However, each of the manners is a combination of a user's mental labor and manual action: first, reading a document, generalizing the document's content, and offering a phrase which generalizes the document's meaning, as a tag; then, manually associating the tag with a specific position of the document via a user interface provided by a service provider.

In view of this, there exists a need for a method for tagging a document, the method that can automatically determine where to tag the document, prompt to a user tags which are respectively suitable for other portions of the current document, and automatically tag the whole document.

SUMMARY OF THE INVENTION

The present invention provides a method and a device for tagging a document, which can automatically generate the document's structural tags and annotate the generated tags at the most suitable position in the document. According to an aspect of the present invention, there is provided a method for tagging a document. The method can comprise: acquiring structural information of said document; retrieving a content blocks list corresponding to an input tag; comparing blocks in said structural information with blocks in said content blocks list, to obtain similar blocks; and annotating said tag at positions, which correspond to said similar blocks, in said document.

According to another aspect of the present invention, there is provided a method for tagging a current document. The method can comprise: acquiring structural information of said current document; comparing blocks in said current structural information with blocks in structural information of an existing document, to obtain similar blocks; and annotating positions, which correspond to said similar blocks, in said current document by a tag which annotated positions, which correspond to said similar blocks, in said existing document.

According to a further aspect of the present invention, there is provided a device for tagging a document. The device can comprise: acquisition means for acquiring structural information of said document; retrieval means for retrieving a content blocks list corresponding to an input tag; comparison means for comparing blocks in said structural information with blocks in said content blocks list, to obtain similar blocks; and tagging means for annotating said tag at positions, which correspond to said similar blocks, in said document.

According to a still further aspect of the present invention, there is provided a device for tagging a current document. The device can comprise: acquisition means for acquiring structural information of said document; comparison means for comparing blocks in said structural information with blocks in structural information of an existing document, to obtain similar blocks; and tagging means for annotating positions, which correspond to said similar blocks, in said current document by a tag which annotated positions, which correspond to said similar blocks, in said existing document.

BRIEF DESCRIPTION OF THE DRAWINGS

The features, advantages and other aspects of the present invention will become more apparent from the following detailed description, when taken in conjunction with the accompanying drawings wherein.

It is to be understood that like reference numerals denote the same parts throughout the figures.

DETAILED DESCRIPTION OF THE INVENTION

For purposes of description, a web page document will be used as a schematic example of a document throughout the following description of embodiments of the present invention. However, it is understood by those skilled in the art that the present invention is not limited to a web page document and is suitable for other types of document content.

A detailed description will be given below to each embodiment of the present invention with reference to the accompanying drawings. It is to be understood that the embodiments to be described below are merely illustrative and not intended to limit the scope of the present invention.

Figure 1:
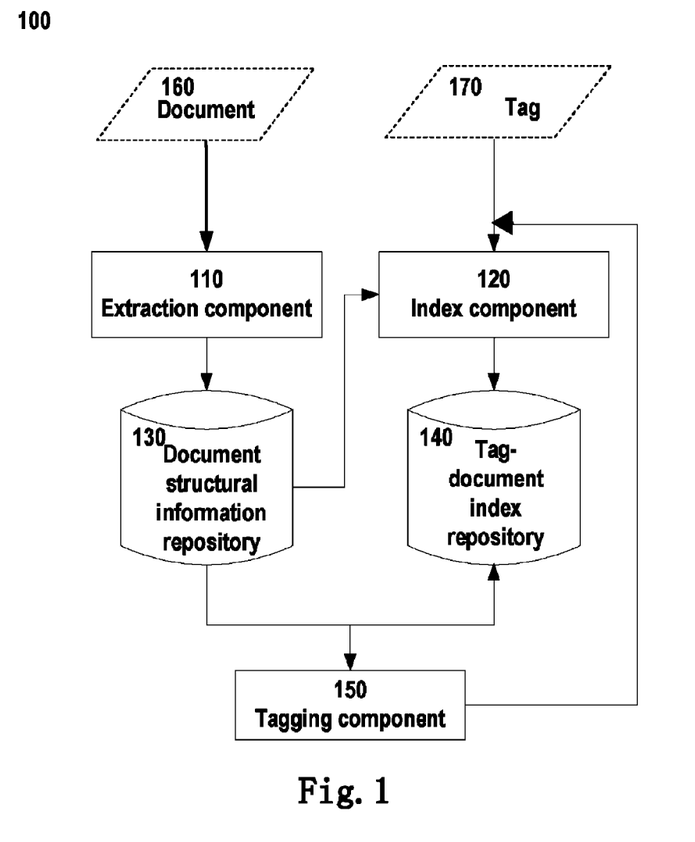
FIG. 1 shows a schematic block diagram of a tagging system according to an embodiment of the present invention.

Referring to FIG. 1, this figure shows a schematic block diagram of a system 100 for tagging a document according to an embodiment of the present invention. As shown in FIG. 1, system 100 can comprise: an extraction component 110, an index component 120, a document structural information repository 130, a tag-document index repository 140, and a tagging component 150.

According to the embodiment of the present invention, extraction component 110 can read an input document 160 and extract structural information representing the structure of the input document 160 from the input document 160 according to a predetermined extraction approach.

Preferably, structural information can be a content blocks tree representing a document's structure. The content blocks tree is a hierarchical tree which saves document information in a structured form and document hierarchical structural information after extraction. Depending on the setting of extraction granularity, the document's chapters, paragraphs, sentences and the like can be mapped to different levels of content blocks. The content blocks tree corresponding to a document can be usually represented by an XML file. However, it is understood by those skilled in the art that other suitable manner can be employed for representing the content blocks tree. Additionally, it is to be understood that the content blocks tree is only one of examples of structural information and the present invention can employ other forms of structural information.

According to the embodiment of the present invention, document structural information repository 130 can be coupled to extraction component 110 for saving the structural information of document 160 as extracted by extraction component 110.

According to the embodiment of the present invention, index component 120 can be coupled to document structural information repository 130 and tag-document index repository 140. Index component 120 can receive a tag 170 input for the document by a user and build an index relationship between tag 170 and document 160. Specifically, index component 120 can build index relationships between structural information of each document saved in document structural information repository 130 and different tags input for the document by a user. Furthermore, index component 120 can save the generated tag-document association in tag-document index repository 140.

According to the embodiment of the present invention, tagging component 150 can be coupled to document structural information repository 130 and tag-document index repository 140, and look up the document's structural information and relevant tag-document index information in document structural information repository 130 and tag-document index repository 140 respectively.

Specifically, tagging component 150 can determine where to annotate a tag according to the structural information and relevant tag-document index of current document 160 and annotate the tag at a corresponding position.

Preferably, tagging component 150 can add relevant correspondence of the tag-document index for current document 160 to tag-document index repository 140, so as to update correspondence in tag-document index repository 140.

Preferably, tagging component 150 can prompt to a user where to annotate a tag, according to the structural information and relevant tag-document index of the current document, and annotate the tag at a corresponding position upon receipt of the user's confirmation.

Although each of the functional components is shown in FIG. 1 separately, it is to be understood that they can integrated partially or completely.

Although in the embodiment shown in FIG. 1 system 100 preferably comprises extraction component 110, index component 120, document structural information repository 130, and tag-document index repository 140, it is understood by those skilled in the art that system 100 per se may not comprise these components. Instead, these components are respectively implemented outside system 100. In this situation, system 100 per se comprises tagging component 150 only, wherein tagging component 150 can directly obtain the document's structural information and tag-document index relationship from the outside of system 100.

A detailed description will be given below to operation procedures of extraction component 110 and index component 120 with reference to FIG. 2 and FIG. 3 respectively, and to a construction and operation procedure of tagging component 150 with reference to FIG. 4 and FIG. 5 respectively.

According to the embodiment of the present invention, a pre-processing step is performed first, i.e., a document structural information repository 130 and a tag-document index repository 140 which serve as a basis for subsequent operations are built through processing a predetermined document. Preferably, contents of document structural information repository 130 and tag-document index repository 140 can be updated step by step. That is to say, after the pre-processing, during the procedure when a user is tagging the document, the structural information related to the document the user is tagging each time can be added to document structural information repository 130, and the relevant tag-document association information is added to tag-document index repository 140.

In the pre-processing stage, preferably, a certain number of representative documents and their corresponding tags can be selected for a given field, so as to guarantee the comprehensiveness and representativeness of information stored in document structural information repository 130 and tag-document index repository 140.

Preferably, respective document structural information repositories 130 and tag-document index repositories 140 can be saved for different fields. In this way, when the user hopes to tag a certain document, the repository first judges the field which the document belongs to, and then performs subsequent processing based on a corresponding document structural information repository and tag-document index repository.

Figure 2:
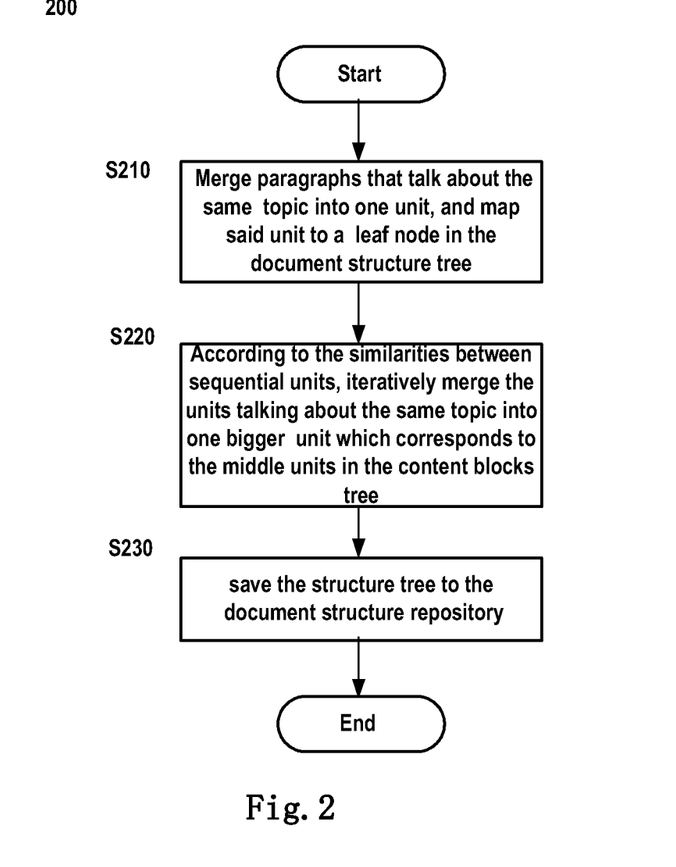
FIG. 2 shows a schematic flowchart of an extraction procedure during a pre-processing stage of the tagging system according to an embodiment of the present invention.
Figure 3:
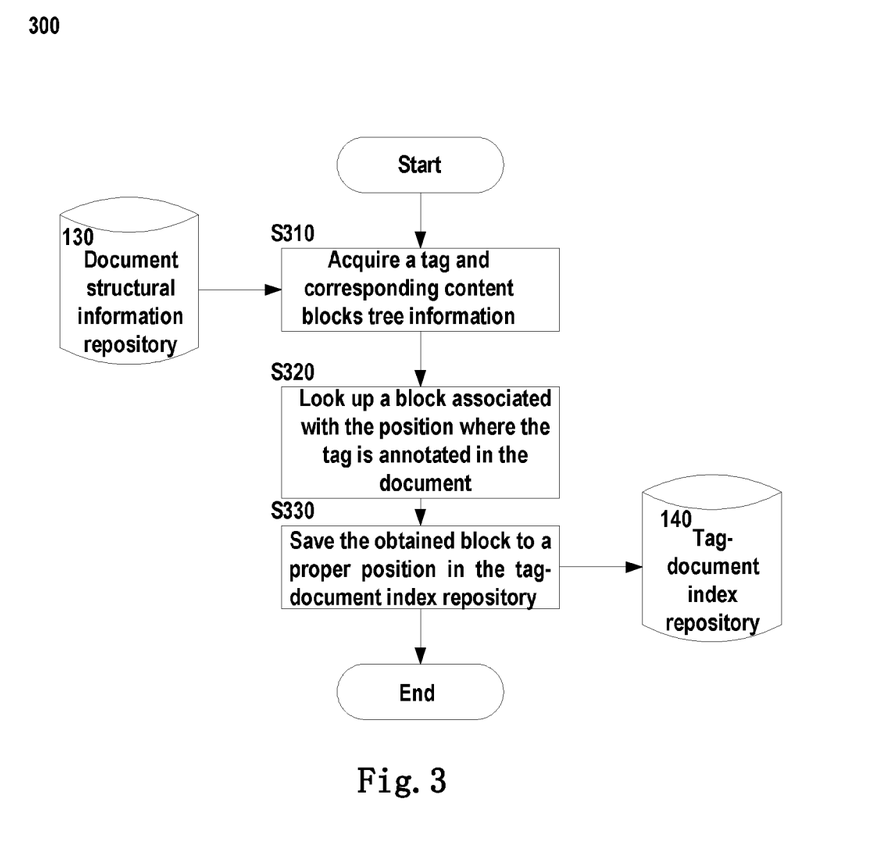
FIG. 3 shows a schematic flowchart of an index procedure during the pre-processing stage of the tagging system according to an embodiment of the present invention.

Referring to FIG. 2, this figure schematically shows operation steps performed by extraction component 110 during the processing procedure according to an embodiment of the present invention.

In the embodiment of the present invention, extraction component 110 can use a predetermined approach to extract from an input document the document's structural information, which predetermined approach can be, for example, the rule based approach or the natural language process (NLP) approach.

The rule base approach basically uses structural features existing in an input document, such as the document's catalogue structure, natural paragraph index and other features, as an extraction basis. These features are all information that can be directly obtained from the document's text contents. Additionally, extraction can be implemented based on structural information of some specific document formats. For example, for an HTML document, six tags from <h1> to <h6> are employed to define the title of the text in an HTML file. Extraction component 110 can judge the document's structure according to <h1> to <h6>.

The natural language process approach is an approach for hierarchically processing a document, by which it is able to process a document or a group of documents which are separated by paragraphs, chapters or some other granularities.

These two approaches outlined above are both known in the art, so reiterative descriptions thereof are omitted here. It is to be understood that extraction component 110 can implement an extraction operation based on other approaches.

Description will be given to operations performed by extraction component 110 in the context of an example of the natural language process approach with reference to FIG. 2.

As shown in FIG. 2, in step S210, the consecutive paragraphs which talk about the same topic are merged into one unit, and each unit is then mapped to a leaf node in the content blocks tree.

In step S220, according to the similarities between sequential units, the units talking about the same topic are iteratively merged into one bigger unit which corresponds to the middle nodes in the content blocks tree.

In step S230, the content blocks tree is saved to document structural information repository 130.

So far, the extraction operation for one document has ended. Each step during the above extraction procedure is familiar to those skilled in the art, so a detailed description thereof is omitted here.

After the above extraction step, document structural information repository 130 as shown in Table 1 is formed. According to the embodiment of the present invention, document structural information repository 130 can preferably comprise two fields, namely document ID and document's structural information (content blocks tree). Multiple documents can be selected, and structural information thereof extracted.

TABLE 1

| Document ID | Document's Structural Information |
| --- | --- |
| Document 1 | Content blocks tree 1 |
| Document 2 | Content blocks tree 2 |
| Document 3 | Content blocks tree 3 |
| ... | ... |
| Document n | Content blocks tree n |

Further illustration will be given below to the operation procedure performed by indexing component 120 during the pre-processing stage with reference to FIG. 3.

In step S310, a tag can be obtained, and content blocks tree information of a document where said tag is annotated is obtained from document structural information repository 130.

In step S320, a lookup is performed for the correspondence between the tag and a block in the content blocks tree, i.e., a lookup is performed for the place where the tag is annotated in the document, so that a block in the content blocks tree corresponding to the position where the tag appears is found.

In step S330, the tag-document correspondence obtained in step S320 is saved to tag-document index repository 140. That is to say, the found block is added to a block list in the tag-document index repository and corresponding to said tag and document. Here, such tag-document correspondence is called "index."

It is to be understood that the steps of building an index relationship between one tag and one document have been schematically shown above. Multiple-to-multiple mapping relationships usually exist between multiple tags and multiple documents, i.e., multiple tags are annotated in respective documents. Therefore, there is a need for the processing as shown in FIG. 3 for each tag and each document with associations thereof.

As shown in Table 2, index relationships between tags and documents are stored in tag-document index repository 140. It should be noted that characters m and n in Tables 1 and 2 are positive integers for purposes of description only, wherein m represents the number of tags, and n the number of documents.

TABLE 2

| Tag | Indicator | Content Block | Indicator | Content Block | ... | Indicator | Content Block |
| --- | --- | --- | --- | --- | --- | --- | --- |
| Tag 1 | Document 1, 1 | $P_{1,1}$ | Document 1, 2 | $P_{1,2}$ | ... | Document 1, n | $P_{1,n}$ |
| Tag 2 | Document 2, 1 | $P_{2,1}$ | Document 2, 2 | $P_{2,2}$ | ... | Document 2, n | $P_{2,n}$ |
| Tag 3 | Document 3, 1 | $P_{3,1}$ | Document 3, 2 | $P_{3,2}$ | ... | Document 3, n | $P_{3,n}$ |
| ... | ... | ... | ... | ... | | ... | ... |
| Tag m | Document m, 1 | $P_{m,1}$ | Document m, 2 | $P_{m,2}$ | ... | Document m, n | $P_{m,n}$ |

As shown in Table 2, tags are stored in the first column for uniquely identifying each of multiple tags associated with multiple documents. And "document i,j" (wherein i<m, j<n) shown in each even column of Table 2 is an indicator pointing to a document in document structural information repository 130, through which the content blocks tree representing a pointed document can be found. Following each "document i,j" is a block list "$P_{i,j}$" representing the correspondence between a document which "document i,j" points to and "tag i," i.e., information of "tag i" related block appearing in a document indicated by "document i, j" is saved in the block list "$P_{i,j}$."

A detailed illustration will be given below to respective operation procedures of extraction component 110 and index component 120 during the pre-processing stage by way of a concrete instance. For example, a document structural information repository 130 and a tag-document index repository 140 need to be built for China's housing market during the pre-processing stage. First of all, an n number of documents relating to the analysis of China's housing market are selected, and the processing as shown in FIG. 2 is performed by extraction component 110 to extract respective content blocks trees for the n number of documents. Then, index component 120 reads an m number of tags corresponding to the n number of documents (wherein m may not equal n, i.e., one document might contain multiple tags).

To facilitate description, assume 2 documents are selected during the pro-processing stage, namely *Analysis of Commercial Housing Prices and Comprehensive Analysis of Housing Market*. At this point, document structural information repository 130 as shown in Table 3 can be obtained through the processing as shown in FIG. 2.

TABLE 3

| Document ID | Document Structural Information |
| --- | --- |
| Document 1 (Analysis of Commercial Housing Prices) | Content blocks tree 1 |
| Document 2 (Comprehensive Analysis of Housing Market) | Content blocks tree 2 |

For example, the tag annotated in paragraph 10 of the first document and in paragraph 20 of the second document is "price," and the tag annotated in paragraphs 2 and 4 of the second document is "new policy," and the tag annotated in paragraph 15 of the second document is "policy interpretation." It is to be understood that a tag can be annotated at a finer-grained position according to the configuration, for example, at a certain sentence in a paragraph. In this instance, paragraphs are taken as an example. At this point, there are 3 tags and 2 documents, i.e., m=3 and n=2. In this situation, tag-document index repository 140 as shown in Table 4 can be obtained through the processing as shown in FIG. 3.

TABLE 4

| Tag | Indicator | Content Block | Indicator | Content Block |
| --- | --- | --- | --- | --- |
| Price | Indicator pointing to document 1 | Block corresponding to paragraph 10 of document 1 | Indicator pointing to document 2 | Block corresponding to paragraph 20 of document 2 |
| New policy | Indicator pointing to document 2 | Block corresponding to paragraph 2 of document 2 + block corresponding to paragraph 4 of document 2 | NULL | NULL |
| Policy interpretation | Indicator pointing to document 2 | Block corresponding to paragraph 15 of document 2 | NULL | NULL |

It should be noted that indicators pointing to document do not need to be arranged in order in tag-document index repository 140, i.e., an indicator pointing to a document with a smaller serial number does not need to be arranged before one pointing to a document with a larger serial number. For example, indicators pointing to document 2 and block lists for document 2 can be respectively saved in column 2 and column 3, indicators pointing to document 1 and block lists for document 1 respectively saved in column 4 and column 5. Logically, the shown tag-document indices can be saved in the form of a linked list. However, space having indicators and block lists saved therein does not need to be allocated for tags and documents between which there is no correspondence (such as document 1 *Analysis of Commercial Housing Prices* and tag 2 "new policy") (which corresponds to "NULL" shown in Table 4). Additionally, if the same tag is annotated in multiple paragraphs of the same document, then the block list corresponding to the tag and the document will comprise multiple blocks, as shown by the entry "block corresponding to paragraph 2 of document 2+block corresponding to paragraph 4 of document 2" in Table 4. A detailed description will be given to the construction and the operation procedure of tagging component 150 according to an embodiment of the present invention with reference to FIG. 4 and FIG. 5 respectively. Before tagging, structural information relating to multiple documents, namely content blocks trees, have been stored in document structural information repository 130, and indices relating to correspondence between tags and documents stored in tag-document index repository 140, through the pre-processing procedure.

Figure 4:
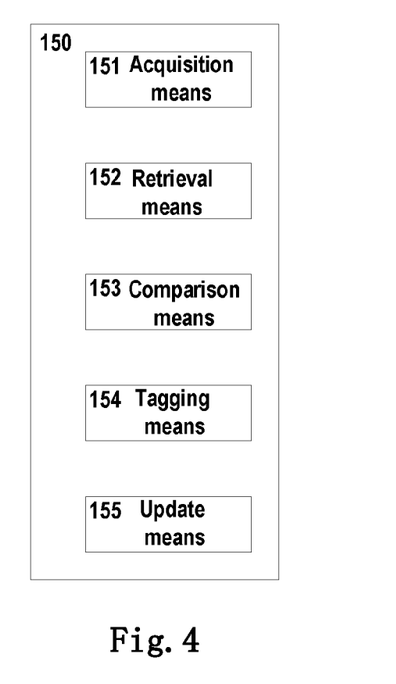
FIG. 4 shows a schematic block diagram of a tagging component of the tagging system according to an embodiment of the present invention.

Referring to FIG. 4, this figure shows a schematic block layout view of tagging component 150 according to an embodiment of the present invention. According to the embodiment of the present invention, tagging component 150 can comprise: acquisition means 151 for acquiring a document's structural information from document structural information repository 130; retrieval means 152 for retrieving a content block list corresponding to an input tag in tag-document index repository 140; comparison means 153 for comparing blocks in the document's structural information acquired by acquisition means 151 with blocks in the content blocks list retrieved by retrieval means 152, to obtain similar blocks in said structural information; and tagging means 154 for annotating the tag at positions corresponding to the similar blocks obtained by comparison means 153. Preferably, tagging component 150 can further comprise update means 155 for updating correspondence in tag-document index repository 140.

Figure 5:
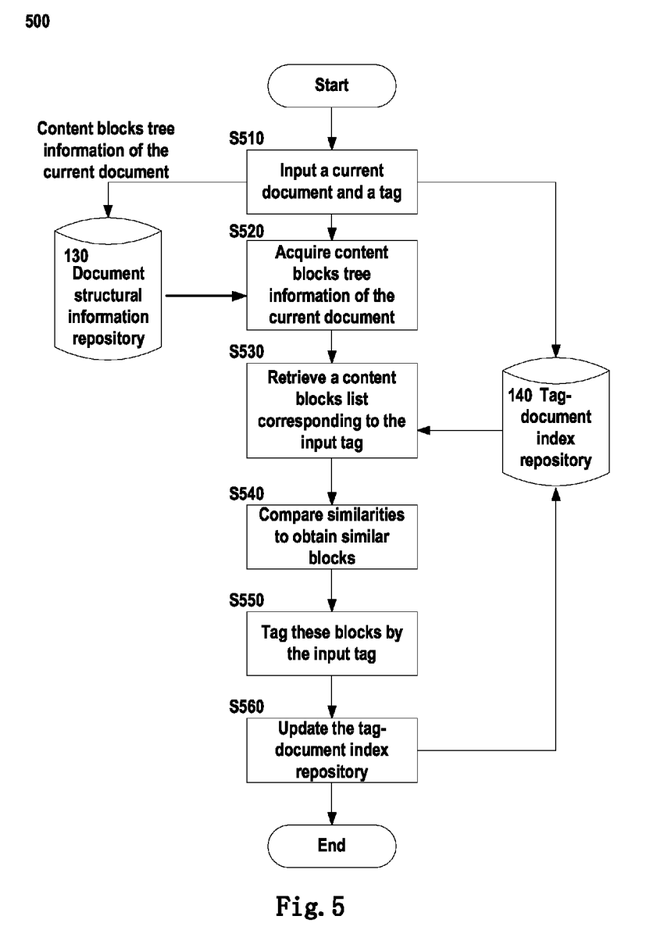
FIG. 5 shows a schematic flowchart of a tagging procedure according to an embodiment of the present invention.

Referring to FIG. 5 now, this figure shows a schematic flowchart of an tagging procedure 500 according to an embodiment of the present invention.

As shown in FIG. 5, after the tagging procedure is initiated, a current document and a tag for the current document are input in step S510.

In step S520, content blocks tree information of the current document is acquired from document structural information repository 130. Of course, content blocks tree information of the current content blocks tree information can also be directly obtained.

In step S530, a user-input tag is retrieved in tag-document index repository 140, and a block list P where said tag annotated is obtained. There can be multiple block lists Ps, i.e., one tag appears in multiple documents, wherein each block list P corresponds to one document. Likewise, each block list P can include multiple blocks, i.e., a tag can annotate various paragraphs of a document, wherein each block corresponds to a block associated with a different position where the tag appears in document corresponding to the block list P respectively.

In step S540, the content blocks tree information of the current document as acquired in step S520 is compared with the block list P obtained in step S530, so as to look up a block similar to each block in the above block list P in the content blocks tree information of the current document. Preferably, for blocks with similar content, the user is given a prompt saying these blocks are suitable for the user-input tag for the current document.

In step S550, said tag can be used to annotate contents at positions corresponding to these blocks with similar content. Preferably, the user makes different responses to the prompt given in step S540. If the prompt is confirmed, then said tag is used to tag contents at positions corresponding to these blocks with similar content. It should be noted if multiple blocks are obtained from the similarity comparison in step S540, then the user is given a prompt for each block, and the user can make a response to the multiple prompts one by one.

Optionally, an update operation is performed to the tag-document index repository in step S560. Specifically, after the inputted tag annotated the current document, since a new association between the input tag and the current document, namely a new tag-document index relationship, is established, content in the tag-document index repository can be updated.

Specifically, an indicator pointing to the current document and a corresponding block list P are added in a row corresponding to the currently input tag in tag-document index repository 140. The procedure of updating the tag-document index repository is as shown by the arrow on the right side of step S560. Updated tag-document index repository 140 can serve as a basis for next round of operations.

Illustration will be given below to the tagging procedure shown in FIG. 5 in terms of an instance. A document structural information repository 130 and a tag-document index repository 140 as shown in Table 3 and Table 4 respectively have been formed through the pre-processing stage.

For example, the user is reading another document about the housing price, which is entitled *Summary of Beijing Real Estate*. Additionally, a tag "price" has been input for this current document. First of all, content blocks tree information of the document *Summary of Beijing Real Estate* is acquired from document structural information repository 130 in step S520. At this point, document structural information repository 130 is as shown in Table 5.

blocks. For example, "block corresponding to paragraph 30 of document 3" and "block corresponding to paragraph 31 of document 3" are obtained after the comparison.

In step S550, the tag "price" annotates document contents of "block corresponding to paragraph 30 of document 3" and "block corresponding to paragraph 31 of document 3." Since a new index relationship is generated between the tag "price" and document 3 (*Summary of Beijing Real Estate*) after step S550, tag-document index repository 140 is updated. This is implemented by adding document 3's corresponding blocks, which are suitable for "price," to the end of the tag "price" in the original table structure. Hence, tag-document index repository 140 is updated in step S560. Updated tag-document index repository 140 is as shown in Table 6.

TABLE 6

| Tag | Indicator | Content Block | Indicator | Content Block | Indicator | Content Block |
|---|---|---|---|---|---|---|
| Price | Indicator pointing to document 1 | Block corresponding to paragraph 10 of document 1 | Indicator pointing to document 2 | Block corresponding to paragraph 20 of document 2 | Indicator pointing to document 3 | Block corresponding to paragraph 30 of document 3 + block corresponding to paragraph 31 of document 3 |
| New policy | Indicator pointing to document 2 | Block corresponding to paragraph 2 of document 2 + block corresponding to paragraph 4 of document 2 | NULL | NULL | NULL | NULL |
| Policy interpretation | Indicator pointing to document 3 | Block corresponding to paragraph 15 of document 2 | NULL | NULL | NULL | NULL |

TABLE 5

| Document ID | Document Content |
|---|---|
| Document 1 (Analysis of Commercial Housing Prices) | Content blocks tree 1 |
| Document 2 (Comprehensive Analysis of Housing Market) | Content blocks tree 2 |
| Document 3 (Summary of Beijing Real Estate) | Content blocks tree 3 |

In step S530, the input tag "price" is retrieved in tag-document index repository 140, and a content block list P which said tag "price" annotated is obtained. It is found through step S530 that the tag "price" was used for "block corresponding to paragraph 10 of document 1" and "block corresponding to paragraph 20 of document 2." In step S540, contents of "block corresponding to paragraph 10 of document 1" and "block corresponding to paragraph 20 of document 2" are compared with content blocks of the content blocks tree of the current document (i.e., document 3 *Summary of Beijing Real Estate*), to look up content blocks in the current document which are similar to the above two content In this way, according to the embodiment of the present invention, it is able to automatically determine a place of a current document where an input tag is annotated, and to automatically annotate said tag at the corresponding place of the current document.

It is to be understood that various modifications and changes can be made to the above embodiments according to the present invention.

For example, according to another embodiment of the present invention, a document can be annotated by other recommended tag. Specifically, other recommended tag that is similar to an input tag can be generated, and the method shown in FIG. 5 is then performed using the generated other recommended tag in place of the input tag, to annotate the whole document.

Specifically, one or more recommended tags that are similar to a user-input tag for a current document are generated through, for example, WordNet (a synonym lexicon frequently used on the Internet). Of course, other approaches can be employed to generate a recommended tag. Here, the user can define the rule and number of generated recommended tags. When WordNet is employed, the user can control the number of generated recommended tags by determining the number of hierarchies used in WordNet (in WordNet, the number of hierarchies is used to control similarities between output words and searched words).

Further illustration will be given below to the tagging procedure according to the embodiment of the present invention in terms of the instance outlined above. For example, recommended tags such as "markup" and "price fall" can be generated for the current user-input tag "price." Then, the processing shown in FIG. 5 is performed using the recommended tag "markup" or "price fall" in place of the input tag.

Further, in the tagging procedure according to a further embodiment of the present invention, the user-input tag for the current document is not necessary, and instead, the system will analyze and process the current document according to existing information in document structural information repository 130 and tag-document index repository 140, and then tag the current document. That is to say, each block in content blocks tree information of the current document is compared with each block in content blocks tree information of a previous document in the document structural information repository. If they are similar to one another, then the current document's blocks are annotated by a tag which annotated the previous document. Description will be given to the tagging procedure according to this embodiment of the present invention with reference to FIG. 6.

Figure 6:
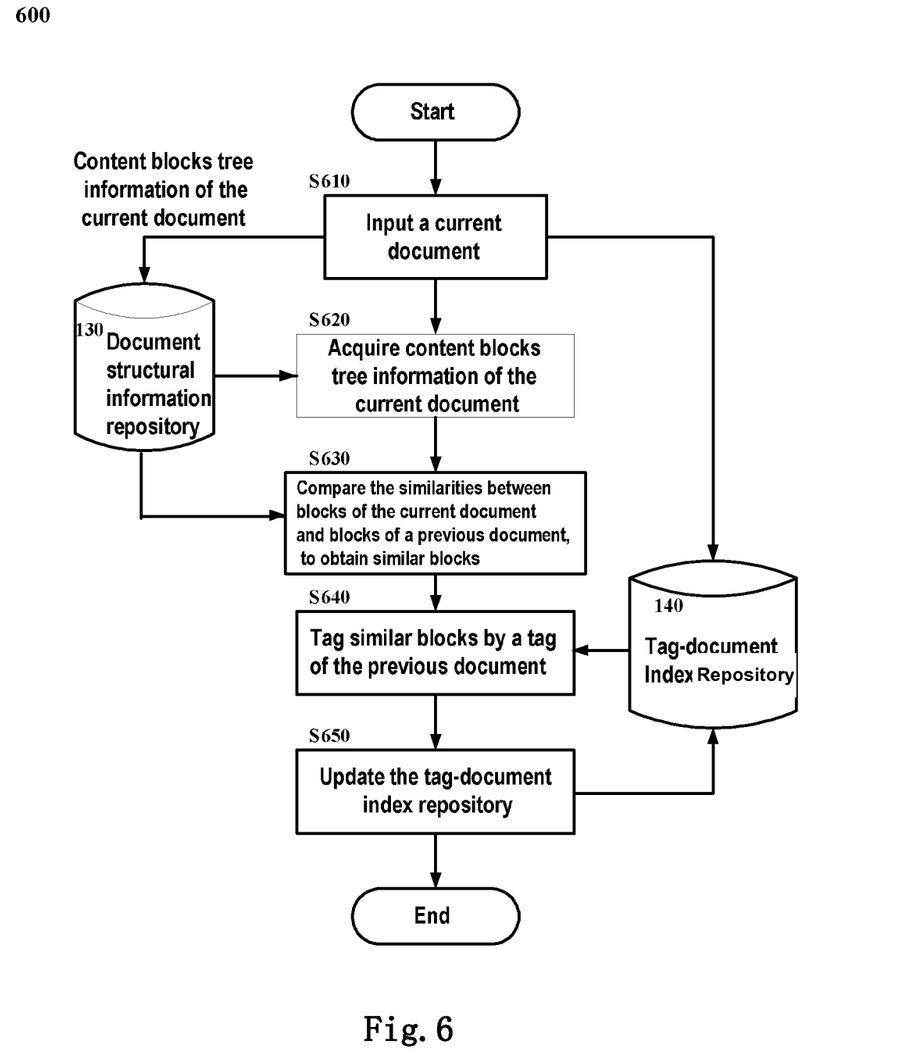
FIG. 6 shows a schematic flowchart of the tagging procedure according to another embodiment of the present invention.

As shown in FIG. 6, a current document is input in step S610.

In step S620, content blocks tree information of the current document is acquired from the document structural information repository.

In step S630, each block in the content blocks tree information of the current document as obtained in step S620 is compared with each block in content blocks tree information of each previous document in document structural information repository 130, so as to acquire similar blocks.

In step S640, contents at positions corresponding to these blocks with similar content are annotated by tags which annotated previous documents.

Optionally, an update operation can be performed to tag-document index repository 140 in step S650.

From the foregoing detailed description of the schematic embodiments of the present invention, it is understood by those skilled in the art that the embodiments of the present invention provide an tagging method and device for precisely locating a user-input tag to proper places in a document, automatically tagging the entirety of the current document using the user-input tag and other associated recommended tag, and automatically summarizing structural features of the current document by means of tags.

Although a plurality of concrete embodiments have been set forth above, it is to be understood that a combination can be made to the tagging methods described by the above embodiments according to needs.

It is to be understood that respective components described in the schematic embodiments of the present invention can be situated at different positions on the Internet, for example, at a provider of web page document content, at a provider of specially providing tagging service, or at other proxy server.

It is to be understood that respective features and steps of the above embodiments and variances thereof can be combined in any way in a real environment, as long as a document can be tagged automatically according to user needs.

The embodiments of the present invention are implemented in a plurality of programming languages, including, without limitation, C, C++, Dephi, Java, etc.

Furthermore, the present invention can be implemented in hardware, software, firmware, or a combination thereof. Those skilled in the art will recognize that the present invention may also be embodied in a computer program product arranged on a signal carrier medium to be used for any proper data processing system. Such signal carrier medium can be a transmission medium or a recordable medium used for machine readable information, including a magnetic medium, optical medium or other proper medium. Examples of a recordable medium include a floppy or magnetic disc in a hard disc drive, an optical disc for an optical drive, a magnetic tape, and other medium those skilled in the art can conceive. Those skilled in the art will further recognize that any communication terminal with proper programming means can perform the steps of the method of the present invention as embodied in a program product for example.

It is to be understood from the foregoing description that modifications and alterations can be made to all embodiments of the present invention without departing from the spirit of the present invention. The description in the present specification is intended to be illustrative and not limiting. The scope of the present invention is limited by the claims only.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for tagging a document, the method comprising using a processor coupled to a memory:
    acquiring a user-input tag;
    building a structural information repository and a tag document index repository by processing a predetermined document;
    acquiring structural information of the document;
    retrieving a content block list corresponding to the user-input tag, wherein the content block list is stored in the tag document index repository;
    comparing a content block in the structural information acquired with a content block in the content block list, thereby obtaining a similar block; and
    annotating the user-input tag at a position corresponding to the similar block in the document, thereby creating a tagged document.

2. The method according to claim 1, further comprising:
    extracting the structural information of the document using a predetermined approach.

3. The method according to claim 2, wherein the predetermined approach comprises a rule based approach.

4. The method according to claim 2, wherein the predetermined approach comprises a natural language process approach.

5. The method according to claim 1, further comprising:
    building a correspondence between the user-input tag and the structural information of the tagged document.

6. The method according to claim 5, further comprising:
    updating the correspondence between the user-input tag and the structural information of the tagged document.

7. The method according to claim 1, further comprising:
    generating a recommended tag similar to the user-input tag; and iteratively performing, using the recommended tag in place of the user-input tag, retrieving a content block list corresponding to the user-input tag, comparing the content block in the structural information acquired with a content block in the content block list, thereby obtaining a similar block, and annotating the user-input tag at a position corresponding to the similar block.

8. A computer-implemented method for tagging a current document, the method comprising using a processor coupled to a memory:
   building a structural information repository and a tag document index repository by processing a predetermined document;
   acquiring structural information of the current document;
   comparing a content block in the structural information acquired of the current document with a content block in structural information of an existing document, to obtain a similar block; and
   annotating a position corresponding to the similar block in the current document by a tag which annotated a position corresponding to the similar block, in the existing document.

9. The method of claim 8, further comprising:
   extracting the structural information of the current document using a predetermined approach, wherein the predetermined approach is at least one from the set of a rule based approach and a natural language process approach.

10. A device for tagging a document, the device comprising at least one processor, the device configured to:
    acquire a user-input tag;
    build a structural information repository and a tag document index repository by processing a predetermined document;
    acquire structural information of the document;
    retrieve a content block list corresponding to the user-input tag, wherein the content block list is stored in the tag document index repository;
    compare a content block in the structural information acquired with a content block in the content block list, thereby obtaining a similar block; and
    annotate the user-input tag at a position corresponding to the similar block in the document, thereby creating a tagged document.

11. The device according to claim 10, further configured to:
    extract the structural information of the document using a predetermined approach.

12. The device according to claim 11, wherein the predetermined approach comprises a rule based approach.

13. The device according to claim 11, wherein the predetermined approach comprises a natural language process approach.

14. The device according to claim 10, further configured to:
    build a correspondence between the user-input tag and the structural information of the tagged document.

15. The device according to claim 14, further configured to:
    update the correspondence between the user-input tag and the structural information of the tagged document.

16. The device according to claim 10, further configured to:
    generate a recommended tag similar to the user-input tag; and using the recommended tag in place of the user-input tag to iteratively perform retrieving s content block list corresponding to the user-input tag, comparing the content block in the structural information acquired with a content block in the content block list, thereby obtaining a similar block and annotating the user-input tag at a position corresponding to the similar block in the document.

17. A device for tagging a current document, the device comprising at least one processor, the device configured to:
    build a structural information repository and a tag document index repository by processing a predetermined document;
    acquire structural information of the current document;
    compare a content block in the structural information of the current document with a content block in structural information of an existing document, to obtain a similar block; and
    annotate a position corresponding to the similar block in the current document by a tag which annotated a position corresponding to the similar block, in the existing document.

18. The device according to claim 17, further configured to:
    extract the structural information of the current document using a predetermined approach, wherein the predetermined approach is at least one from the group of a rule based approach and a natural language process approach.

19. A non-transitory computer readable storage medium tangibly embodying computer readable instructions which, when executed, cause a computer to carry out a method comprising:
    acquiring a user-input tag;
    building a structural information repository and tag document index repository by processing a predetermined document;
    acquiring structural information of the document;
    retrieving a content block list corresponding to the user-input tag, wherein the content block list is stored in the tag document index repository;
    comparing a content block in the structural information acquired with a content block in the content block list, thereby obtaining a similar block; and
    annotating the user-input tag at a position corresponding to the similar block in the document, thereby creating a tagged document.

* * * * *